(12) United States Patent
Mukai

(10) Patent No.: US 10,353,682 B2
(45) Date of Patent: Jul. 16, 2019

(54) INFORMATION PROCESSING DEVICE, STORAGE MEDIUM, AND METHOD

(71) Applicant: FUJITSU LIMITED, Kawasaki-shi, Kanagawa (JP)

(72) Inventor: Yuta Mukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 13 days.

(21) Appl. No.: 15/639,811

(22) Filed: Jun. 30, 2017

(65) Prior Publication Data

US 2018/0018153 A1 Jan. 18, 2018

(30) Foreign Application Priority Data

Jul. 14, 2016 (JP) .................................. 2016-139830

(51) Int. Cl.
*G06F 8/41* (2018.01)
*G06F 9/30* (2018.01)
(Continued)

(52) U.S. Cl.
CPC ............ *G06F 8/452* (2013.01); *G06F 8/4442* (2013.01); *G06F 9/30047* (2013.01);
(Continued)

(58) Field of Classification Search
CPC ........ G06F 12/0815; G06F 9/00; G06F 12/00; G06F 9/381; G06F 11/3471; G06F 8/452; G06F 9/30047; G06F 9/3802
See application file for complete search history.

(56) References Cited

U.S. PATENT DOCUMENTS 8,706,964 B1 * 4/2014 Koh .................... G06F 12/0888
   711/118
8,893,103 B2 * 11/2014 Ravi ........................ G06F 8/33
   717/151
(Continued)

FOREIGN PATENT DOCUMENTS

JP 2010-244205 10/2010
JP 2015-222477 12/2015

OTHER PUBLICATIONS

Lea Hwang Lee et al.; Instruction Fetch Energy Reduction Using Loop Caches for Embedded Applications with Small Tight Loops; ACM; pp. 267-269; <https://dl.acm.org/citation.cfm?id=313944>; retrieved on Apr. 8, 2019 (Year: 1999).*

(Continued)

*Primary Examiner* — Geoffrey R St Leger
*Assistant Examiner* — Cuong V Luu
(74) *Attorney, Agent, or Firm* — Xsensus LLP

(57) ABSTRACT

A device includes a processor configured to: divide loop in a program into first loop and second loop when compiling the program, the loop accessing data of an array and prefetching data of the array to be accessed at a repetition after prescribed repetitions at each repetition, the first loop including one or more repetitions from an initial repetition to a repetition immediately before the repetition after the prescribed repetitions, the second loop including one or more repetitions from the repetition after the prescribed repetitions to a last repetition, and generate an intermediate language code configured to access data of the array using a first region in a cache memory and prefetch data of the array using a second region in the cache memory in the first loop, and to access and prefetch data of the array using the second region in the second loop.

7 Claims, 8 Drawing Sheets

(51) Int. Cl.
*G06F 9/38* (2018.01)
*G06F 12/0875* (2016.01)
*G06F 12/0862* (2016.01)

(52) U.S. Cl.
CPC ........ *G06F 9/30065* (2013.01); *G06F 9/3802* (2013.01); *G06F 9/383* (2013.01); *G06F 12/0862* (2013.01); *G06F 12/0875* (2013.01); *G06F 2212/452* (2013.01); *G06F 2212/6024* (2013.01)

(56) References Cited

U.S. PATENT DOCUMENTS

| | | | | |
|---|---|---|---|---|
| 2004/0154012 | A1* | 8/2004 | Wang | G06F 9/3842 717/158 |
| 2005/0262308 | A1* | 11/2005 | Nishiyama | G06F 8/4442 711/137 |
| 2005/0268039 | A1* | 12/2005 | Archambault | G06F 9/30047 711/119 |
| 2006/0248520 | A1* | 11/2006 | Kawabata | G06F 8/443 717/160 |
| 2007/0083730 | A1* | 4/2007 | Vorbach | G06F 9/3897 712/10 |
| 2012/0265941 | A1* | 10/2012 | Chen | G06F 8/4442 711/137 |
| 2014/0053131 | A1* | 2/2014 | Ravi | G06F 8/33 717/110 |
| 2015/0339229 | A1 | 11/2015 | Zhang et al. | |

OTHER PUBLICATIONS

Jean-Loup Baer et al.; An Effective on Chip Preloading Scheme to Reduce Data Access Penalty; ACM; pp. 176-186; <https://dl.acm.org/citation.cfm?id=125932>; retrieved on Apr. 8, 2019 (Year: 1991).*

Manish Verma et al.; Cache Aware Scratchpad Allocation Algorithm; IEEE; 6 pages; <https://dl.acm.org/citation.cfm?id=969148>; retrieved on Apr. 8, 2019 (Year: 2004).*

* cited by examiner

```
M=MAX(M1,M2,M3);

for(i=1; i<=M; i++) {    //LOOP A
  //ANOTHER PROCESS
  a[i] = 0; (SECTOR A)
  prefetch(a[i+M1]); (SECTOR B)
  //ANOTHER PROCESS
}
for(i= M+1; i<=N; i++) {  //LOOP A
  //ANOTHER PROCESS
  a[i] = 0; (SECTOR B)
  prefetch(a[i+M1]); (SECTOR B)
  //ANOTHER PROCESS
} for(i=1; i<=M; i++) {    //LOOP B
  //ANOTHER PROCESS
  a[i] = 0; (SECTOR A)
  prefetch(a[i+M2]); (SECTOR B)
  //ANOTHER PROCESS
}
for(i= M+1; i<=N; i++) {  //LOOP B
  //ANOTHER PROCESS
  a[i] = 0; (SECTOR B)
  prefetch(a[i+M2]); (SECTOR B)
  //ANOTHER PROCESS
} for(i=1; i<=M; i++) {    //LOOP C
  //ANOTHER PROCESS
  a[i] = 0; (SECTOR A)
  prefetch(a[i+M3]); (SECTOR B)
  //ANOTHER PROCESS
}
for(i= M+1; i<=N; i++) {  //LOOP C
  //ANOTHER PROCESS
  a[i] = 0; (SECTOR B)
  prefetch(a[i+M3]); (SECTOR B)
  //ANOTHER PROCESS
}
```

INFORMATION PROCESSING DEVICE, STORAGE MEDIUM, AND METHOD

CROSS-REFERENCE TO RELATED APPLICATION

This application is based upon and claims the benefit of priority of the prior Japanese Patent Application No. 2016-139830, filed on Jul. 14, 2016, the entire contents of which are incorporated herein by reference.

FIELD

The embodiment discussed herein is related to an information processing device, a storage medium, and a method.

BACKGROUND

In related art, there is a function that is referred to as prefetching and is for, in advance, reading out data which are predicted to be used in a process in a future into a cache memory. Further, there is one kind of the cache memory that is referred to as a sector cache in which a memory region is divided into plural units referred to as sectors and a used sector may be selected for each cache line.

Examples of related art include a technique for effectively using the cache memory. For example, there is a compiler device that analyzes a source program which is executed in an information processing device in which a cache memory with a sector function is installed and assesses whether or not a data set to be processed in each loop is reusable in execution of loop processing. The compiler device decides a sector division ratio and sector numbers from the number of ways and the maximum number of ways of a system that are requested for storing the data set about which reusability is assessed and inserts an instruction statement to which a sector division instruction and the sector number are added in a loop.

Further, there is an information processing device that has a shared cache memory which includes the sector function and is divided in accordance with the reusability degree of data and a control unit which changes the division ratio of the sectors in the shared cache memory. The control unit calculates the sector division ratio based on the data access amount that has the size of data which first and second jobs access and the frequencies of accesses and the capacity of the shared cache memory in accordance with the specification by a program of the second job while the first job and the second job are executed and thereby changes the sector division ratio to the calculated sector division ratio.

Examples of related art include Japanese Laid-open Patent Publication No. 2010-244205 and Japanese Laid-open Patent Publication No. 2015-222477.

SUMMARY

According to an aspect of the invention, an information processing device includes: a memory; and a processor coupled to the memory. The processor is configured to: divide loop processing in a program into first loop processing and second loop processing when compiling the program, the loop processing accessing data of an array and prefetching data of the array to be accessed at a repetition processing after prescribed repetition processings at each repetition processing in the loop processing, the first loop processing including one or more repetition processings from an initial repetition processing to a repetition processing immediately before the repetition processing after the prescribed repetition processings, the second loop processing including one or more repetition processings from the repetition processing after the prescribed repetition processings to a last repetition processing, and generate an intermediate language code based on the program when compiling the program, the intermediate language code being configured to access data of the array by using a first region in a cache memory and prefetch data of the array by using a second region in the cache memory in the first loop processing, and to access and prefetch data of the array by using the second region in the second loop processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates one example of a source program that results from loop transformation.

DESCRIPTION OF EMBODIMENT

In related art, there is a problem that even in a case where a memory access is known to successively occur on a source code, as for a first portion, it is difficult to prefetch data that are used in the first portion, and a cache miss occurs, resulting in performance degradation.

It is desirable to intend a performance improvement by restraining occurrence of a cache miss.

This embodiment will hereinafter be described in detail with reference to drawings.

(Embodiment)

Figure 1:
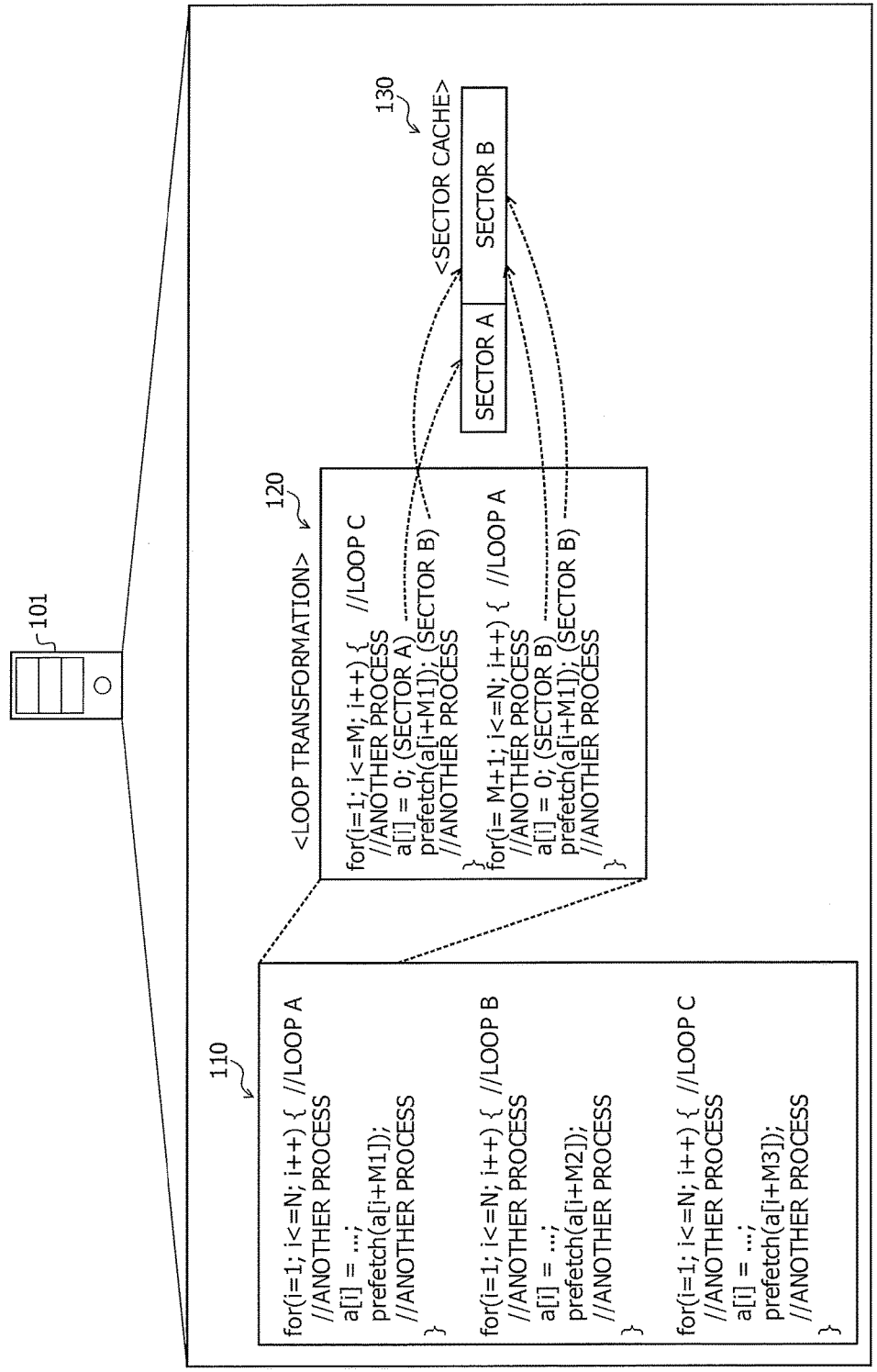
FIG. 1 illustrates one example of a compiling method according to an embodiment.

FIG. 1 illustrates one example of a compiling method according to the embodiment. In FIG. 1, an information processing device 101 is a computer that compiles a source program sc and thereby generates an executable file f. The information processing device 101 may be a general-purpose computer, such as a personal computer (PC) or a tablet PC, or a server, for example.

The source program sc is a computer program that is described by using a programming language and describes instructions, procedures, and so forth which cause the computer to act. Compiling is conversion of a source code that is described in a programming language into an object code as a machine language that a computer is capable of interpreting. The executable file f is a file in an executable format that is generated by adding a library or the like to the object code resulting from the conversion. Examples of programming languages may include the C programming language, Fortran, Java®, C++, and so forth.

The executable file f generated by the information processing device 101 is executed by a computer that has a cache memory which is referred to as a sector cache. The sector cache is a cache memory which divides a memory region into plural units referred to as sectors and in which a used sector may be selected for each cache line.

The executable file f may target the information processing device 101 or may target another computer.

Here, a cache miss is a state where when certain data are requested, the data are not present on the cache memory, and the data may not be read from the cache memory. Occurrence of the cache miss leads to a considerable performance problem because the time for transferring the data from a main memory becomes a wait time.

Note that, in this embodiment, it is assumed that a simple expression of "cache miss" represents a cache miss that occurs due to a demand request, that is, a cache miss (demand miss) other than the cache miss that occurs in prefetching.

To avoid the cache miss, it is effective to perform prefetching, in which data are read out to the cache memory, before the data are requested. For example, in a case where it is known that a memory access successively occurs on the source code, the data that may be requested in a future process may be read out to the cache memory in advance.

However, even about the memory accesses that are known to successively occur on the source code, it is difficult to prefetch a first portion of the memory accesses. For example, there is a case where it is not possible to identify a position on the program well in advance before the data are requested or it is difficult to arrange an instruction for prefetching although the position may be identified.

For example, it is difficult to prefetch the data that are used in a first portion of repetitions of loop processing. The loop processing is a process in which a process is repeated under a certain condition. For example, the loop processing is expressed by a for statement or a while statement. Further, for example, in a case of prefetching the data of the (i+M)th repetition at the ith repetition of the loop processing, the first portion of the repetitions is the portion from the beginning to the Mth repetition.

In a case where the time used for transferring the data from the main memory to the cache memory is equivalent to the time in which M repetitions of the loop processing progress, the data of the (i+M)th repetition is often prefetched at the ith repetition. Accordingly, in this case, the data used in the beginning to the Mth repetition are not prefetched.

For example, a program 110 illustrated in FIG. 1 is one example of the source program sc. The program 110 includes a loop A, a loop B, and a loop C. A description of prefetch(a[i+M]) means that the transfer of the data of a[i+M] from the main memory to the cache memory is started at the time point, that is, prefetching.

The loops A, B, and C prefetch the data in the repetitions after M1, M2, and M3 repetitions, respectively. Prefetching is performed in advance by the numbers of repetitions of the loops A, B, and C that use the same times as the respective times for data transfers from the main memory to the cache memory, and the data may be prepared in the cache memory before processes (a[i]= . . . ;) in which the data are actually used.

However, the loops A, B, and C do not prefetch the data from a[1] to a[M1], a[M2], and a[M3], respectively. Those data are temporarily placed on the cache memory in earlier loops. However, those data may be discharged by the data of a[M1], a[M2], and a[M3] or later before the next loop starts. Thus, in the loops A, B, and C, it is possible that the cache miss occurs in the repetitions from the beginning to the M1th, M2nd, and M3rd, respectively.

Accordingly, in this embodiment, a description will be made about a compiling method in which the sector cache is used to allocate a dedicated sector to the first portion of the memory access that successively occurs, occurrence of the cache miss in the portion is thereby restrained, and a performance improvement is intended. A process example of the information processing device 101 will be described below.

(1) In a case where the source program sc is compiled, the information processing device 101 divides the loop processing in the source program sc into first loop processing and second loop processing. Here, the loop processing that becomes a division target is loop processing in which the data of an array are accessed (referred to) in each repetition and the data of the array to be accessed in the repetition after prescribed repetitions are prefetched. The array is a data structure in which values of the same kind are aligned and stored. The data of the array are stored while being aligned in an order on the main memory, for example.

The first loop processing is a portion that includes the repetitions of processes from the beginning to the Mth repetition (immediately before the repetition after M repetitions) of the loop processing. The second loop processing is a portion that includes the repetitions of processes from the (M+1)th repetition (the repetition after M repetitions) to the end of the loop processing. Further, M is an integer that indicates the relative position of the repetition number in which prefetching is performed and represents from how later repetition, in which the data of array are accessed, the data of the array are prefetched.

The value of M may arbitrarily be set. For example, as the value of M, each of the values that are defined for the loop processing in the source program sc (M1, M2, and M3 in the program 110) may be set. Further, as the value of M, the maximum value among the values that are defined for the loop processing in the source program sc (the maximum value among M1, M2, and M3 in the program 110) may be set.

Raising the loop A of the program 110 as one example, as denoted by a reference numeral 120, the loop A is divided into the first loop processing from the beginning to the Mth repetition and the second loop processing from the (M+1)th repetition to the end. However, M is the maximum value among M1, M2, and M3 that are defined for the loops A, B, and C in the program 110.

(2) In the first loop processing, the information processing device 101 accesses the data of the array by using a first region in the cache memory and generates an intermediate language code for prefetching the data of the array by using a second region in the cache memory. Further, in the second loop processing, the information processing device 101 generates an intermediate language code for accessing and prefetching the data of the array by using the second region.

Here, the first region is any sector (hereinafter referred to as "sector A") among plural sectors that result from division of the cache memory. Further, the second region is a region that does not overlap with the first region in the cache memory and is another sector (hereinafter referred to as "sector B") among plural sectors resulting from division of the cache memory, which is different from the sector A. Further, the intermediate language code is a code that is described by an intermediate expression language that is intermediate between the source code described by the programming language and the object code as the machine language.

Raising the loop A of the program 110 as one example, as denoted by a reference numeral 130, in the first loop processing, the data of the array is accessed by using the sector A, and the intermediate language code for prefetching the data of the array is generated by using the sector B. Further, as denoted by the reference numeral 130, in the second loop processing, the intermediate language code for accessing and prefetching the data of the array is generated by using the sector B.

Actually, the loop processing is not transformed in a source level as a reference numeral 120, but a process for an expression inside a compiler is performed. For example, the reference numeral 120 denotes that which sector is used is expressed in parentheses in each row but the information about which sector is used is actually recorded inside the compiler, and an instruction is selected in accordance with the information when conversion into the machine language is performed.

(3) The information processing device 101 generates the executable file f of the source program sc based on the generated intermediate language code. For example, the information processing device 101 converts the generated intermediate language code into a sequence of instructions in the machine language and thereby generates the executable file f of the source program sc.

The generated executable file f is stored in a storage device of the information processing device 101 or output to another computer, for example.

As described above, the dedicated sector is allocated to the first portion of the memory access that successively occurs on the source program sc, the occurrence of the cache miss in the portion is thereby restrained, and a performance improvement of the information processing device 101 is intended.

In the example of the program 110, in a case where the loops B and C are also transformed as the loop A denoted by the reference numeral 120, the cache miss (demand miss) occurs to the data from a[i] to a[M] in the loop A. However, the data are not discharged because other data do not use the sector A, and the demand miss does not occur in the loop B or the loop C.

(Hardware configuration example of information processing device 101)

Figure 2:
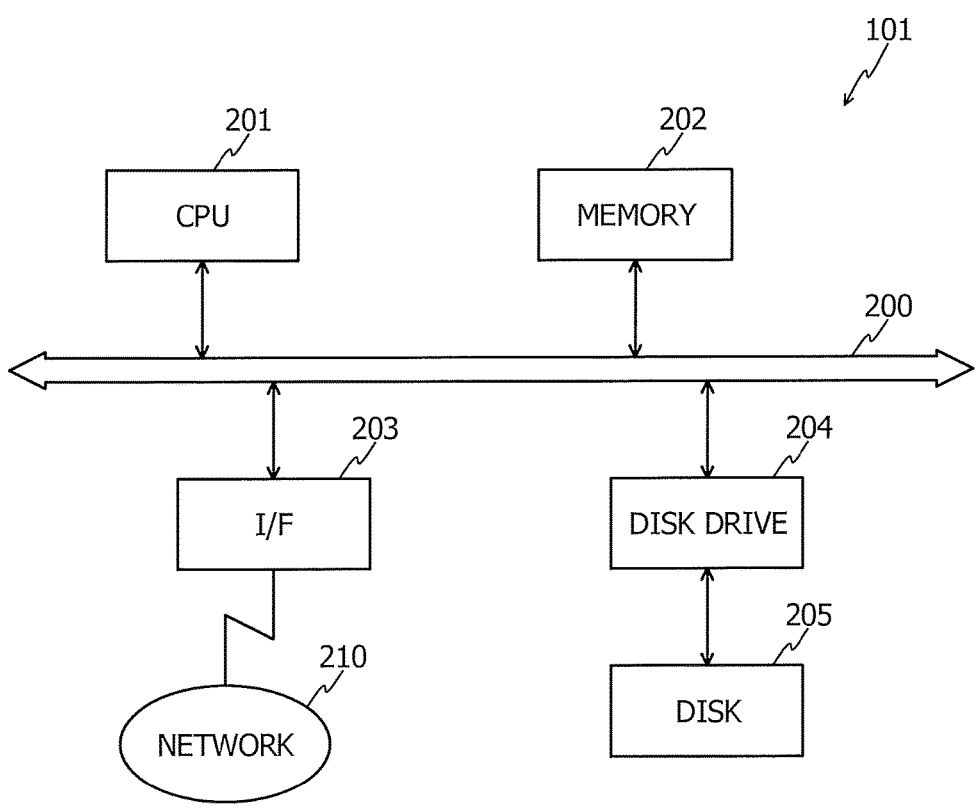
FIG. 2 illustrates a hardware configuration example of an information processing device.

FIG. 2 illustrates a hardware configuration example of the information processing device 101. In FIG. 2, the information processing device 101 has a central processing unit (CPU) 201, a memory 202, an interface (I/F) 203, a disk drive 204, and a disk 205. Further, the configuration units are coupled together by a bus 200.

Here, the CPU 201 conducts control of the whole information processing device 101. The memory 202 has a read only memory (ROM), a random access memory (RAM), a flash ROM, and so forth. For example, the flash ROM or the ROM stores various programs, and the RAM is used as a work area of the CPU 201. The RAM includes the main memory and the cache memory (sector cache), for example. The programs that are stored in the memory 202 are loaded to the CPU 201 and thereby cause the CPU 201 to execute coded processes. Further, the memory 202 includes the main memory and the cache memory that is put between the CPU 201 and the main memory. The cache memory is the sector cache, for example.

The I/F 203 is coupled with a network 210 through a communication line and is coupled with an external computer via the network 210. The network 210 includes a local area network (LAN), a wide area network (WAN), the Internet, a mobile communication network, and so forth, for example. Further, the I/F 203 conducts an interface between the network 210 and internal portions of the information processing device 101 and controls inputs and outputs of data from external computers. As the I/F 203, a modem, a LAN adapter, or the like may be employed, for example.

The disk drive 204 controls reading and writing of data with respect to the disk 205 while following control by the CPU 201. The disk 205 stores data that are written by the control by the disk drive 204. As the disk 205, a magnetic disk, an optical disk, and so forth may be raised, for example.

Further, the information processing device 101 may have a solid state drive (SSD), an input device, a display, and so forth, for example, other than the above-described configuration units.

(Functional Configuration Example of Information Processing Device 101)

Figure 3:
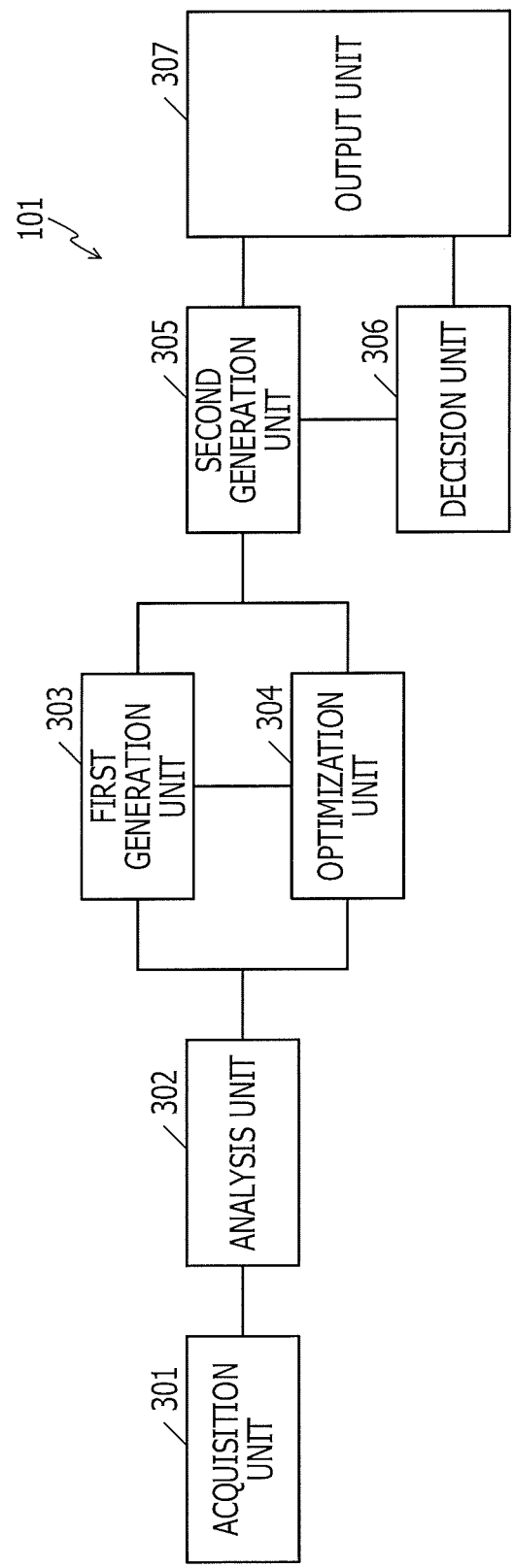
FIG. 3 illustrates a functional configuration example of the information processing device.

FIG. 3 illustrates a functional configuration example of the information processing device 101. In FIG. 3, the information processing device 101 is configured to include an acquisition unit 301, an analysis unit 302, a first generation unit 303, an optimization unit 304, a second generation unit 305, a decision unit 306, and an output unit 307. The acquisition unit 301 to the output unit 307 have functions as a control unit. The function is realized by causing the CPU 201 to execute the program stored in the storage devices such as the memory 202 and the disk 205, which are illustrated in FIG. 2, or by the I/F 203, for example. Processing results of the functional units are stored in the storage devices such as the memory 202 and the disk 205, for example.

The acquisition unit 301 acquires the source program sc. For example, the acquisition unit 301 acquires the source program sc (for example, the program 110 illustrated in FIG. 1) by an operation input by a user who uses an input device, which is not illustrated. Further, for example, the acquisition unit 301 may acquire the source program sc from an external computer by the I/F 203.

The analysis unit 302 performs a syntactic analysis and a semantic analysis of the source program sc. Here, the syntactic analysis is to check whether or not a statement or a structure that is described in the source program sc conforms to a language specification. The semantic analysis is to check whether or not a type of a variable or a statement that is described in the source program sc is semantically correct.

For example, the analysis unit 302 first performs a lexical analysis of the source program sc. The lexical analysis is to convert the alignment of characters that configure the source program sc into the alignment of tokens such as keywords, variables, and operators, for example. Then, the analysis unit 302 analyzes the relationships among the tokens about the alignment of the token, which is obtained by the lexical analysis, and thereby performs the syntactic analysis and the semantic analysis of the source program sc.

The first generation unit 303 divides the loop processing in the source program sc into the first loop processing and the second loop processing based on the intermediate language code that is obtained by the syntactic analysis and the semantic analysis of the source program sc. Here, the loop processing that becomes the division target is the loop processing in which the data of the array are accessed in each repetition and the data of the array to be accessed in the repetition after M repetitions are prefetched.

Further, the first loop processing is the portion that includes the repetitions of processes from the beginning to the Mth repetition of the loop processing. The second loop processing is the portion that includes the repetitions of processes from the (M+1)th repetition to the end of the loop processing. M is an integer that indicates the relative position of the repetition number in which prefetching is performed and represents from how later repetition, in which the data of array are accessed, the data of the array are prefetched.

In the description made below, the loop processing in the source program sc, in which the data of the array are accessed in each repetition and the data of the array to be accessed in the repetition after M repetitions are prefetched, may be denoted as "loop R".

For example, the first generation unit 303 divides each of the loops R, which are registered in a loop list, into a first loop R1 and a second loop R2. The loop list records the loops R in the source program sc in a list structure.

More specifically describing, the first generation unit 303 replicates the loop R and thereby generates the first loop R1, for example. Next, the first generation unit 303 sets a repetition start number "B" of the loop R as a repetition start number of the first loop R1. Here, the repetition start number is a value of a variable in a case where a process is performed for the first time and is an initial value of a loop variable in a for statement, for example.

Further, the first generation unit 303 sets "B+M" as a repetition finishing number of the first loop R1. Here, the repetition finishing number is a value of a variable in a case where a repeated process is finished and is an upper limit value of a loop variable in a for statement, for example. As the value of M, for example, the maximum value among all the loops R is set.

Next, the first generation unit 303 inserts the first loop R1 in a position immediately before the loop R in the intermediate language code such that the first loop R1 is executed immediately before the loop R. Then, the first generation unit 303 changes the repetition start number of the loop R in the intermediate language code to "B+M+1" and thereby generates the second loop R2 (loop R).

Further, in the first loop R1, the first generation unit 303 accesses the data of the array by using the sector A in the cache memory and generates the intermediate language code for prefetching the data of the array by using the sector B in the cache memory. Further, in the second loop R2, the first generation unit 303 uses the sector B to access the data of the array and to generate the intermediate language code for prefetching the data of the array.

Here, as described above, the sector A is any sector among plural sectors that result from division of the cache memory (sector cache). Further, the sector B is another sector among plural sectors resulting from division of the cache memory, which is different from the sector A.

For example, in the first loop R1, the first generation unit 303 adds information that the sector used for accessing the data of the array is set as "sector A" to the first loop R1. That is, the sector used for all memory accesses in the first loop R1 is set as "sector A".

More specifically describing, for example, the main memory is accessed by a load-store instruction. The load-store instruction has a field that specifies which sector is used. The first generation unit 303 adds the information to the first loop R1 in the intermediate language code so as to generate the machine language in which "sector A" is set in the field.

Further, in the first loop R1, the first generation unit 303 adds information that the sector used for prefetching the data of the array to be accessed in a future repetition is set as "sector B" to the first loop R1. That is, the sector used for all pieces of prefetching in the first loop R1 is set as "sector B".

Further, in the second loop R2, the first generation unit 303 adds information that the sector that is used for accessing the data of the array and is used for prefetching the data of the array to be accessed in a future repetition is set as "sector B" to the second loop R2. That is, the sector used for all memory accesses and for all pieces of prefetching in the second loop R2 is set as "sector B".

Accordingly, each of the loops R is transformed such that the sector A is allocated to the first portion of the repetitions (the first loop R1) and the sector B is allocated to the remaining portion, with respect to each of the loops R in the source program sc.

Raising the program 110 illustrated in FIG. 1 as one example, the intermediate language code that is generated by the first generation unit 303, which is expressed in the source level, is as illustrated in FIG. 4.

FIG. 4 illustrates one example of a source program that results from loop transformation. In FIG. 4, a program 400 expresses the loop transformation for each of the loops A, B, and C in the program 110 in the source level. In a case where each of the loops A, B, and C is transformed as the program 400, the cache miss occurs to the data from a[i] to a[M] in the loop A. However, the data are not discharged because other data do not use the sector A, and the demand miss does not occur in the loop B or the loop C.

Further, the program 400 expresses which sector is used in parentheses in each row. However, the information about which sector is used is actually recorded inside the compiler, and an instruction is selected in accordance with the information when conversion into the machine language is performed. That is, the loop R is not transformed in the source level, but a process for expressions inside the compiler (the intermediate language code) is performed as described above.

However, here, it is presumed that all the loops R in the source program sc are recorded in the list structure and are operable with respect to the expressions inside the compiler (the intermediate language code) and the repetition start and finishing numbers of the loop R are operable. Further, it is presumed that information that is referred to in subsequent machine language generation may be added to a process of a memory access or prefetching in the loop R and a new process may be added in the loop R. An existing compiler may in general perform such operations.

Returning to the description of FIG. 3, the optimization unit 304 performs an optimizing process of the intermediate language code of the source program sc, which is generated by the first generation unit 303. For example, the optimization unit 304 may delete a method that is not called from anywhere from the generated intermediate language code, while considering the method as an undesired method.

The above-described process by the first generation unit 303 may be performed based on the intermediate language code of the source program sc to which the optimizing process is applied by the optimization unit 304. That is, for example, the optimization unit 304 may perform the optimizing process of the intermediate language code that is obtained by the syntactic analysis and the semantic analysis of the source program sc and output the intermediate language code to the first generation unit 303.

The second generation unit 305 generates the executable file f of the source program sc based on the intermediate language code of the source program sc. For example, the second generation unit 305 converts the intermediate language code that is output from the optimization unit 304 or the first generation unit 303 into a sequence of instructions in the machine language and thereby generates the executable file f of the source program sc.

The decision unit 306 decides the size of the sector A in the cache memory (sector cache) and the size of the sector B. Here, the sizes (storage capacities) of the sector A and the sector B are represented by the numbers of lines of cache lines, for example. Further, in a case where the number of sectors in the cache memory is "2", the size of the sector B may be obtained by subtracting the size of the sector A from the whole size of the cache memory.

For example, the decision unit 306 executes the generated executable file f while setting the size of the sector A as a certain value and thereby measures the number of cache misses (hereinafter referred to as "cache miss number d") about the sector A. Next, the decision unit 306 determines whether or not the measured cache miss number d is equal to or less than the value resulting from the division of the size of the sector A by the size of a cache line, that is, the number of lines of the sector A.

While changing the size (the number of lines) of the sector A, the decision unit 306 searches for the minimum size (the number of lines) in which the cache miss number d is equal to or less than the number of lines of the sector A. Then, the decision unit 306 decides the minimum size obtained by the search as the size of the sector A. Accordingly, in a condition in which the number of cache misses that occur in the sector A becomes the minimum, the size of the sector A that is the minimum size is obtained.

In a case where the number of lines of the sector A is set as a certain value and where the number of lines is greater than the cache miss number d, the number of lines to be searched for is a value that is equal to or less than the certain value. In a case where the number of lines is less than the cache miss number d, the number of lines to be searched for is a value that is greater than the certain value. Thus, the bisection method or the like may be used for the search for the minimum size.

Further, in a case where the size of the sector A becomes too large, it is possible that the data that are placed on the cache memory when the sector A is not provided are discharged and the processing time increases. Thus, the maximum size that may be set as the size of the sector A may be set in advance. For example, the maximum size of the sector A may be set to approximately 20% of the whole sector cache by an operation input by the user who uses the input device, which is not illustrated.

Further, in a case where the minimum size of the sector A that is searched for is equal to or greater than a preset maximum size, the information processing device 101 may not apply the scheme described herein but may perform an existing compiling process for the source program sc. The existing compiling processes include a syntactic and semantic analysis processes, an optimizing process, and a code generation process, for example.

Process contents of the search for the size (minimum size) of the sector A will be described later with reference to FIG. 8.

The output unit 307 outputs the generated executable file f of the source program sc. Examples of output formats of the output unit 307 may include storage in the storage devices such as the memory 202 and the disk 205, transmission to an external computer by the I/F 203, and so forth.

For example, the output unit 307 may output the executable file f of the source program sc, which is associated with line information that indicates the decided numbers of lines of the sector A and the sector B. Accordingly, in a computer that has the sector cache, the numbers of lines of the sector A and the sector B, which are indicated by the line information, are set, and the executable file f of the source program sc is executed.

For example, with respect to each of the loops R in the source program sc, the information processing device 101 accesses the data of the array by using the sector A and prefetches the data of the array by using the sector B in the first loop R1 from the beginning to the Mth repetition. Further, the information processing device 101 uses the sector B to access the data of the array and to prefetch the data of the array in the second loop R2 from the (M+1)th repetition to the end. Thus, compared to a case where an existing compiling process is applied, the occurrence of the cache miss to the data in the first portion of the repetitions of the loop R is restrained, and a performance improvement of the information processing device 101 is intended.

(Compiling Process Procedures of Information Processing Device 101)

Next, compiling process procedures of the information processing device 101 will be described.

Figure 5:
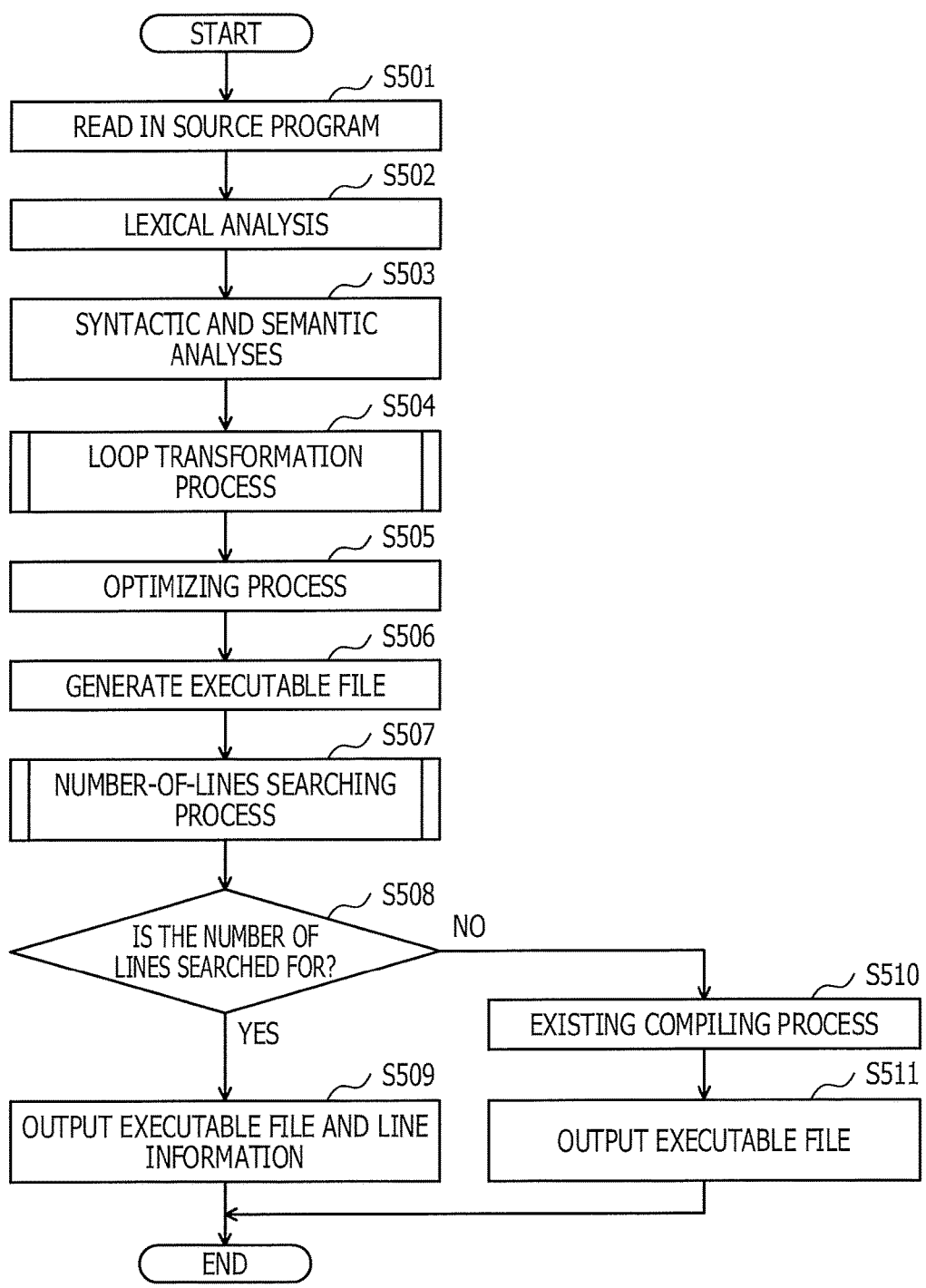
FIG. 5 is a flowchart that illustrates one example of compiling process procedures of the information processing device.

FIG. 5 is a flowchart that illustrates one example of the compiling process procedures of the information processing device. In the flowchart in FIG. 5, the information processing device 101 first reads in the source program sc (step S501).

Next, the information processing device 101 performs the lexical analysis of the source program sc (step S502). Then, the information processing device 101 analyzes the relationships among the tokens about the alignment of the token, which is obtained by the lexical analysis, and thereby performs the syntactic analysis and the semantic analysis of the source program sc (step S503).

Next, the information processing device 101 executes a loop transformation process for transforming the loop R in the source program sc into the first loop R1 and the second loop R2 based on the intermediate language code that is obtained by the syntactic analysis and the semantic analysis of the source program sc (step S504). Process procedures of the loop transformation process will be described later with reference to FIG. 6 and FIG. 7.

Next, the information processing device 101 performs the optimizing process of the intermediate language code of the source program sc (step S505). The optimizing process may be executed immediately before the loop transformation process in step S504, for example. Then, the information processing device 101 generates the executable file f of the source program sc based on the intermediate language code of the source program sc (step S506).

Next, the information processing device 101 executes a number-of-lines searching process for searching the number of lines (size) of the sector A in the cache memory (sector cache) (step S507). Process procedures of the number-of-lines searching process will be described later with reference to FIG. 8. Then, the information processing device 101 determines whether or not the number of lines of the sector A is searched for (step S508).

Here, in a case where the number of lines of the sector A is searched for (step S508: Yes), the information processing device 101 outputs the executable file f of the source program sc, which is associated with line information that indicates the numbers of lines of the sector A and the sector B (step S509). Then, the information processing device 101 finishes a series of processes in this flowchart.

On the other hand, in step S508, in a case where the number of lines of the sector A is not searched for (step S508: No), the information processing device 101 executes an existing compiling process for the source program sc (step S510). Then, the information processing device 101 outputs the executable file f of the source program sc that is obtained by the existing compiling process (step S511) and finishes the series of processes in this flowchart.

Accordingly, the dedicated sector A is allocated to the first portion of the memory access that successively occurs in each of the loops R in the source program sc, and the executable file f that restrains the occurrence of the cache miss during program execution is thereby generated.

<Loop Transformation Process Procedures>

Next, a description will be made about the process procedures of the loop transformation process in step S504, which is illustrated in FIG. 5.

Figure 6:
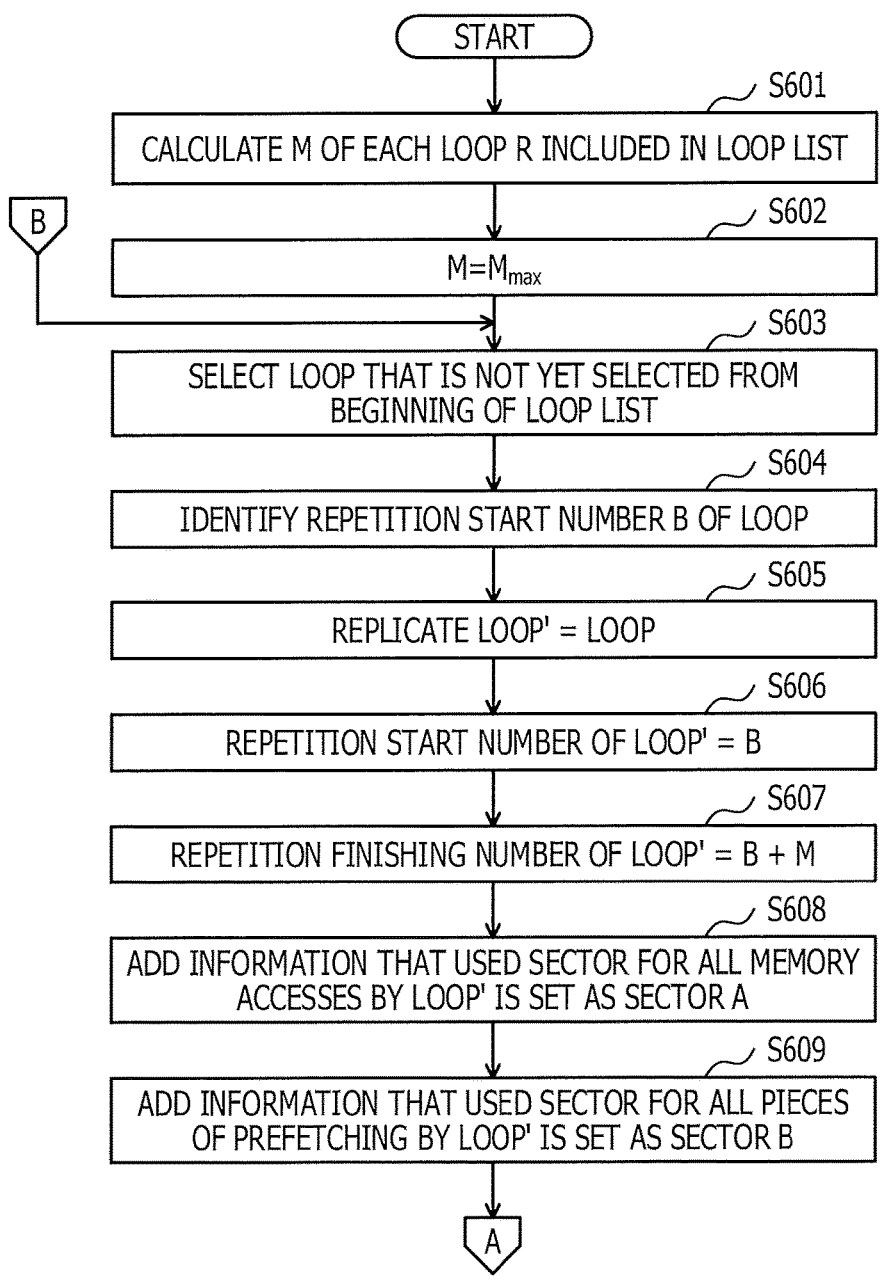
FIGS. 6 and 7 are flowcharts that illustrate one example of process procedures of a loop transformation process.
Figure 7:
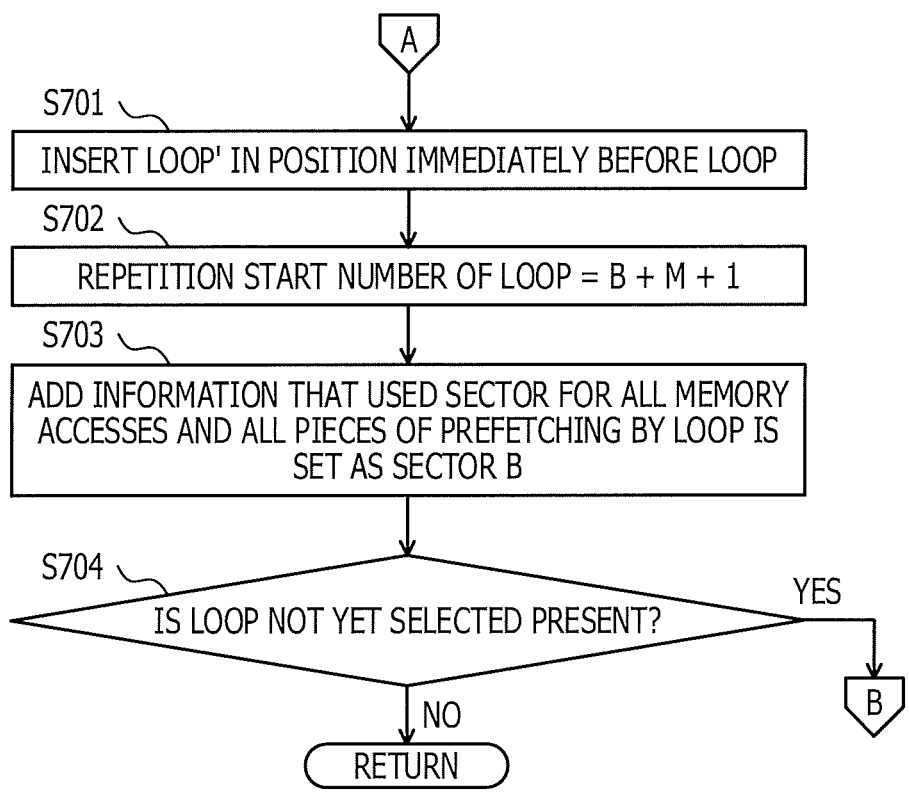

FIGS. 6 and 7 are flowcharts that illustrate one example of the process procedures of the loop transformation process. In the flowchart in FIG. 6, the information processing device 101 first identifies an integer M that represents the relative position of the repetition number, in which prefetching is performed, in each of the loops R included in the loop list of the source program sc (step S601).

Next, the information processing device 101 sets a maximum value $M_{max}$ among the identified integers M in the loops R as the value of the integer M that is common to all the loops R (step S602). Then, the information processing device 101 selects the loop R (hereinafter referred to as "loop") that is not yet selected from the beginning of the loop list (step S603).

Next, the information processing device 101 identifies a repetition start number B of the selected loop (step S604). Then, the information processing device 101 replicates the selected loop to generate a loop' (step S605).

Next, the information processing device 101 sets the identified repetition start number B of the loop as the repetition start number of the loop' (step S606). Then, the information processing device 101 sets "B+M" as the repetition finishing number of the loop' (step S607). Note that the value of the integer M is $M_{max}$ that is set in step S602.

Next, the information processing device 101 adds information that a used sector for all memory accesses by the loop' is set as the sector A to the loop' (step S608). Then, the information processing device 101 adds information that a used sector for all pieces of prefetching by the loop' is set as the sector B to the loop' (step S609) and moves to step S701 illustrated in FIG. 7.

In the flowchart in FIG. 7, the information processing device 101 first inserts the loop' in a position immediately before the loop such that the loop' is executed immediately before the loop (step S701). Next, the information processing device 101 sets "B+M+1" as the repetition start number of the loop (step S702).

Next, the information processing device 101 adds information that a used sector for all memory accesses and all pieces of prefetching by the loop is set as the sector B to the loop (step S703). Then, the information processing device 101 determines whether or not the loop that is not yet selected from the loop list is present (step S704).

Here, in a case where the loop that is not yet selected is present (step S704: Yes), the information processing device 101 returns to step S603 illustrated in FIG. 6. On the other hand, in a case where the loop that is not yet selected is not present (step S704: No), the information processing device 101 returns to the step in which the loop transformation process is called.

Accordingly, each of the loops R in the source program sc is divided into the loop' from the beginning to the Mth repetition and the loop from the (M+1)th repetition to the end. Further, in the loop', the sector A in the cache memory is used to access the data of the array, and the sector B in the cache memory is used to prefetch the data of the array. Further, in the loop, the sector B in the cache memory is used to access and prefetch the data of the array.

<Number-of-Lines Searching Process Procedures>

Next, a description will be made about the process procedures of the number-of-lines searching process in step S507, which is illustrated in FIG. 5. Here, a description will be made about an example where the minimum size (the number of lines) of the sector A in the cache memory is searched for by using the bisection method.

Figure 8:
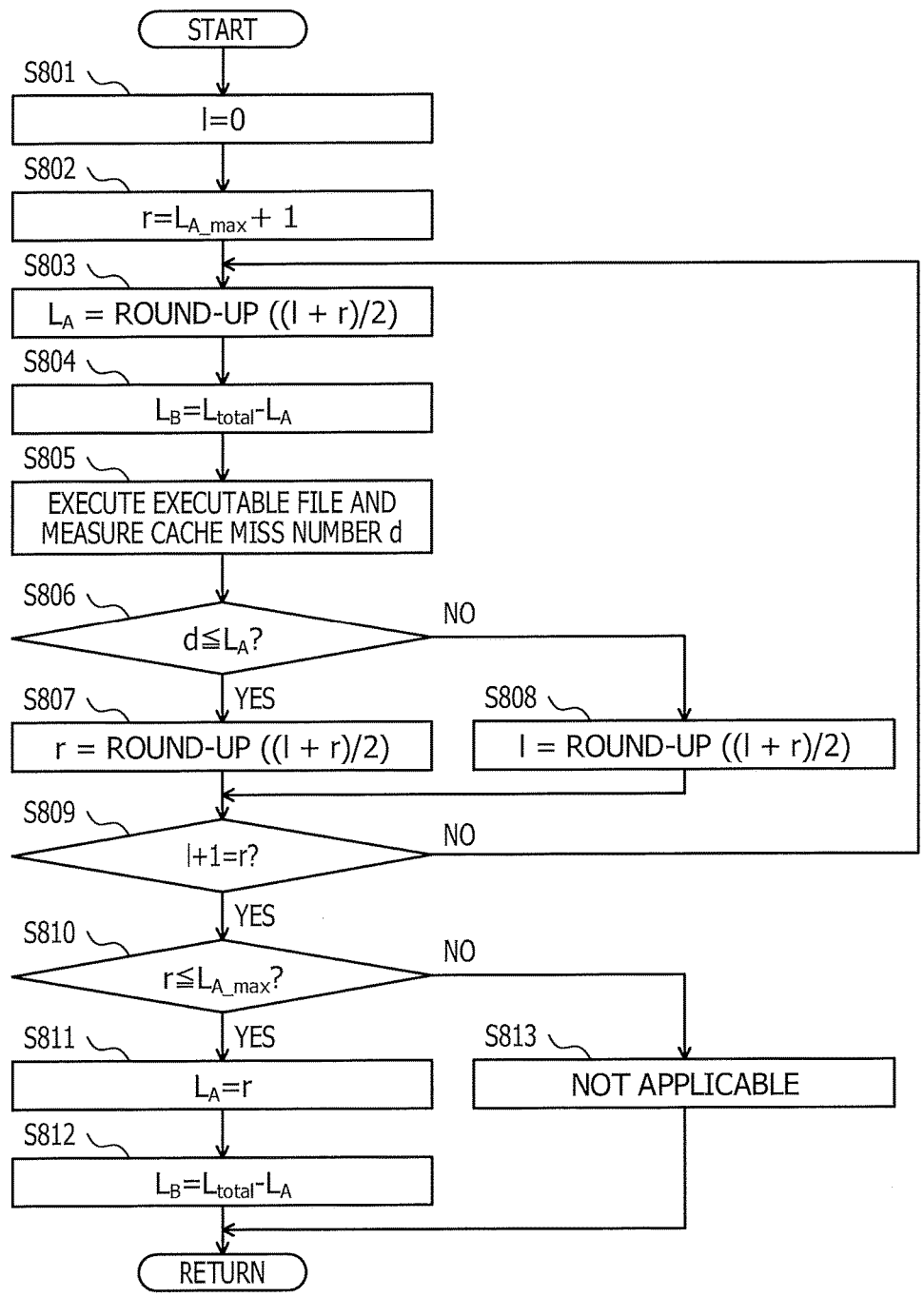
FIG. 8 is a flowchart that illustrates one example of process procedures of a number-of-lines searching process.

FIG. 8 is a flowchart that illustrates one example of the process procedures of the number-of-lines searching process. In FIG. 8, the information processing device 101 first sets a variable I (left) as "I=0" (step S801) and sets a variable r (right) as "r=$L_{A\_max}$+1" (step S802). $L_{A\_max}$ is a threshold value that indicates the maximum size which may be set as the size of the sector A.

Next, the information processing device 101 sets the number of lines $L_A$ of the sector A in the cache memory as "$L_A$=round-up ((I+r)/2)" (step S803) and sets the number of lines $L_B$ of the sector B in the cache memory as "$L_B=L_{total}-L_A$" (step S804). Note that "round-up ( )" represents rounding up numbers after the decimal points. $L_{total}$ represents the size (the number of lines) of the whole cache memory.

Next, the information processing device 101 executes the executable file f of the source program sc, which is generated in step S506 illustrated in FIG. 5, and measures the cache miss number d about the sector A (step S805). Then, the information processing device 101 determines whether or not the measured cache miss number d is equal to or less than the number of lines $L_A$ (step S806).

Here, in a case where the cache miss number d is equal to or less than the number of lines $L_A$ (step S806: Yes), the information processing device 101 sets the variable r as "r=round-up ((I+r)/2)" (step S807) and moves to step S809. On the other hand, in a case where the cache miss number d is greater than the number of lines $L_A$ (step S806: No), the information processing device 101 sets the variable I as "I=round-up ((I+r)/2)" (step S808).

Then, the information processing device 101 determines whether or not "I+1=r" holds (step S809). Here, in a case where "I+1=r" does not hold (step S809: No), the information processing device 101 returns to step S803. On the other hand, in a case where "I+1=r" holds (step S809: Yes), the information processing device 101 determines whether or not the variable r is equal to or less than the threshold value $L_{A\_max}$ (step S810).

Here, in a case where the variable r is equal to or less than the threshold value $L_{A\_max}$ (step S810: Yes), the information processing device 101 decides the number of lines $L_A$ of the sector A as "$L_A$=r" (step S811), decides the number of lines $L_B$ of the sector B as "$L_B=L_{total}-L_A$" (step S812), and returns to the step in which the number-of-lines searching process is called.

On the other hand, in a case where the variable r is greater than the threshold value $L_{A\_max}$ (step S810: No), the information processing device 101 determines that the scheme described herein is not applicable to the source program sc (step S813) and returns to the step in which the number-of-lines searching process is called.

Accordingly, in a condition in which the number of cache misses that occur in the sector A becomes the minimum, the size of the sector A that is the minimum size is searched for.

As described in the foregoing, in the information processing device 101 according to the embodiment, the loop R in the source program sc is divided into the first loop R1 from the beginning to the position immediately before the repetition after M repetitions and the second loop R2 from the repetition after M repetitions to the end. Further, the information processing device 101 accesses the data of the array by using the sector A in the cache memory and prefetches the data of the array by using the sector B in the cache memory in the first loop R1. The information processing device 101 generates the intermediate language code for accessing and prefetching the data of the array by using the sector B in the second loop R2. Further, the information processing device 101 generates the executable file f of the source program sc based on the generated intermediate language code.

Accordingly, the dedicated sector A in the cache memory (sector cache) is allocated to the first portion of the memory access that successively occurs in each of the loops R in the source program sc. Thus, the data in the portion is less likely to be discharged from the cache memory, the occurrence of the demand miss is thereby restrained even without prefetching, and a performance improvement of the information processing device 101 is intended.

Further, the information processing device 101 executes the generated executable file f while changing the size of the sector A and measures the cache miss number d about the sector A that corresponds to the size. Further, the information processing device 101 decides the minimum size in which the measured cache miss number d is equal to or less than the number of lines $L_A$ as the size of the sector A and outputs the line information that indicates the decided size of the sector A, which is associated with the executable file f. The number of lines $L_A$ is the value resulting from the division of the size of the sector A by the cache lines.

Accordingly, in a condition in which the number of cache misses that occur in the sector A in the cache memory becomes the minimum, the size of the sector A that is the minimum size is searched for, and the size is set as the size of the sector A.

Further, the information processing device 101 sets the sizes of the sector A and the sector B in the cache memory based on the line information and executes the executable file f. For example, the information processing device 101 accesses the data of the array by using the sector A and prefetches the data of the array to be accessed in the repetition after M repetitions by using the sector B in the first loop R1 from the beginning to the position immediately before the repetition after M repetitions of the loop R. Further, the information processing device 101 uses the sector B to access the data of the array and to prefetch the data of the array to be accessed in the repetition after M repetitions in the second loop R2 from the repetition after M repetitions to the end of the loop R.

Accordingly, the just sufficient size as the size of the sector A is allocated, the cache miss that occurs due to a too large size of the sector A is thereby restrained in execution of the source program sc, and a performance improvement of the information processing device 101 is intended.

Here, it is assumed that there is a computer in which the cache capacity is "512 KiB/thread", the size of a cache line is "128 B", the memory bandwidth is "10 GiB/s/thread", and the memory latency is "100 ns". A case is assumed where this computer is used and the source program sc in which one array of 128 KiB/thread as the whole loop is accessed in the ascending order is executed.

A portion of the array is not placed on the cache memory at the start time point of the loop. However, the ideal execution time that ignores the wait time for the data transfer from the main memory due to the demand miss is "128 KiB/10 GiB/s=12 μs" from the transfer size and the memory bandwidth. In an actual case, the wait time for transferring the data from the cache memory to the CPU is present. However, it is assumed that this wait time may be ignored because this wait time is very short compared to the wait time for the main memory.

Because prefetching has to be performed in advance by 100 ns that corresponds to the memory latency, the timing for performing the prefetching is in advance by 10 GiB/s*100 ns/128 B=9 lines. Accordingly, in prefetching of the program 110 illustrated in FIG. 1, the demand miss occurs in the first nine lines in the repetitions.

Compared to the ideal execution time 12 μs, the execution time that includes the wait time due to the demand miss is "12.9 μs (=9*100 ns+12 μs)". Thus, an influence of 8% is present. In a case where the scheme described herein is used, the ideal execution time is achieved, and further the cache capacity that is consumed for the execution comes to "0.2% (9 lines*128 B/line/512 KiB)" of the whole cache capacity.

Note that the compiling method and the cache control method that have been described in the embodiment may be realized by executing a program that is in advance prepared by a computer such as a personal computer or a workstation. The compiling program is recorded in a computer-readable recording medium such as a hard disk, a flexible disk, a CD-ROM, a magneto-optical disk (MO), a digital versatile disk (DVD), or a universal serial bus (USB) memory and is executed by being read out from the recording medium by a computer. Further, the compiling program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An information processing device comprising:
a memory; and
a processor coupled to the memory and configured to:
divide loop processing in a program into first loop processing and second loop processing when compiling the program, the loop processing accessing data of an array and prefetching the data of the array to be accessed at a repetition processing after prescribed repetition processings at each repetition processing in the loop processing, the first loop processing including one or more repetition processings from an initial repetition processing to a repetition processing immediately before the repetition processing after the prescribed repetition processings, the second loop processing including one or more repetition processings from the repetition processing after the prescribed repetition processings to a last repetition processing,
generate an intermediate language code based on the program when compiling the program, the intermediate language code being configured to access the data of the array by using a first region in a cache memory and prefetch the data of the array by using a second region in the cache memory in the first loop processing, and to access and prefetch the data of the array by using the second region in the second loop processing,
generate an executable file of the program based on the generated intermediate language code,
execute the generated executable file while changing a size of the first region and measure a number of cache misses about the first region that corresponds to the size when executing the generated executable file,
determine a minimum size in which the measured number of cache misses is equal to or less than a value which results from division of a size by the size of a cache line as the size of the first region, and
output information that indicates the determined size of the first region, which is associated with the generated executable file.

2. The information processing device according to claim 1, wherein
the cache memory includes a memory region which is divided into the first region and the second region, and a region which is used being configured to select from the first region and the second region for each cache line,
the processor is configured to set sizes of the first region and the second region in the cache memory based on information that indicates the size of the first region and execute the generated executable file.

3. A non-transitory computer-readable storage medium encoded with computer-readable instructions that, when executed by a processor, cause the processor to perform an information processing method, the method comprising:
dividing loop processing in a program into first loop processing and second loop processing when compiling the program, the loop processing accessing data of an array and prefetching the data of the array to be accessed at a repetition processing after prescribed repetition processings at each repetition processing in the loop processing, the first loop processing including one or more repetition processings from an initial repetition processing to a repetition processing immediately before the repetition processing after the prescribed repetition processings, the second loop processing including one or more repetition processings from the repetition processing after the prescribed repetition processings to a last repetition processing;
generating an intermediate language code based on the program when compiling the program, the intermediate language code being configured to access the data of the array by using a first region in a cache memory and prefetch the data of the array by using a second region in the cache memory in the first loop processing, and to access and prefetch the data of the array by using the second region in the second loop processing;
generating an executable file of the program based on the generated intermediate language code;
executing the generated executable file while changing a size of the first region and measuring a number of cache misses about the first region that corresponds to the size when executing the generated executable file;
determining a minimum size in which the measured number of cache misses is equal to or less than a value which results from division of the size by a size of a cache line as the size of the first region; and
outputting information that indicates the determined size of the first region, which is associated with the generated executable file.

4. The non-transitory computer-readable storage medium according to claim 3, wherein
the cache memory includes a memory region which is divided into the first region and the second region, and a region which is used being configured to select from the first region and the second region for each cache line,
the method further comprises:
setting sizes of the first region and the second region in the cache memory based on information that indicates the size of the first region and executing the generated executable file.

5. A method of compiling a program, the method comprising:
dividing loop processing in a program into first loop processing and second loop processing when compiling the program, the loop processing accessing data of an array and prefetching the data of the array to be accessed at a repetition processing after prescribed repetition processings at each repetition processing in the loop processing, the first loop processing including one or more repetition processings from an initial repetition processing to a repetition processing immediately before the repetition processing after the prescribed repetition processings, the second loop processing including one or more repetition processings from the repetition processing after the prescribed repetition processings to a last repetition processing;
generating an intermediate language code based on the program when compiling the program, the intermediate language code being configured to access the data of the array by using a first region in a cache memory and prefetch the data of the array by using a second region in the cache memory in the first loop processing, and to access and prefetch the data of the array by using the second region in the second loop processing;
generating an executable file of the program based on the generated intermediate language code;
executing the generated executable file while changing a size of the first region and measuring a number of cache misses about the first region that corresponds to the size when executing the generated executable file;
determining a minimum size in which the measured number of cache misses is equal to or less than a value which results from division of the size by a size of a cache line as the size of the first region; and
outputting information that indicates the determined size of the first region, which is associated with the generated executable file.

6. The method according to claim 5, wherein
the cache memory includes a memory region which is divided into the first region and the second region, and a region which is used being configured to select from the first region and the second region for each cache line,
the method further comprises:

setting sizes of the first region and the second region in the cache memory based on information that indicates the size of the first region and executing the generated executable file.

7. A method of controlling a cache by a processor in a computer, the method comprising:

generating an executable file of a program based on a generated intermediate language code, the intermediate language code being generated while compiling the program;

accessing data of an array by using a first region in a cache memory and prefetching the data of the array to be accessed in a loop at a prescribed frequency by using a second region of the cache memory in a first loop processing including one or more repetition processings from an initial repetition processing to a repetition processing immediately before the repetition processing after prescribed repetition processings;

accessing the data of the array by using the second region and prefetching the data of the array to be accessed in the loop at the prescribed frequency by using the second region in a second loop processing including one or more repetition processings from the repetition processing after the prescribed repetition processings to a last repetition processing;

executing the generated executable file while changing a size of the first region and measuring a number of cache misses about the first region that corresponds to the size when executing the generated executable file;

determining a minimum size in which the measured number of cache misses is equal to or less than a value which results from division of the size by a size of a cache line as the size of the first region; and outputting information that indicates the determined size of the first region, which is associated with the generated executable file.

* * * * *